US007555648B2

(12) United States Patent
Riku et al.

(10) Patent No.: US 7,555,648 B2
(45) Date of Patent: Jun. 30, 2009

(54) CONTENT MANAGEMENT SYSTEM, RECORDING MEDIUM AND METHOD

(75) Inventors: Shinko Riku, Fuchu (JP); Junichi Yamamoto, Fuchu (JP); Hidekazu Nishizawa, Machida (JP); Masataka Yamada, Fuchu (JP); Naoto Akimoto, Tama (JP); Shinichi Matsukawa, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 446 days.

(21) Appl. No.: 10/539,754

(22) PCT Filed: Dec. 19, 2003

(86) PCT No.: PCT/JP03/16388

§ 371 (c)(1),
(2), (4) Date: Apr. 4, 2006

(87) PCT Pub. No.: WO2004/057476

PCT Pub. Date: Jul. 8, 2004

(65) Prior Publication Data

US 2006/0212927 A1    Sep. 21, 2006

(30) Foreign Application Priority Data

Dec. 20, 2002  (JP) ............................. 2002-370284

(51) Int. Cl.
*H04L 9/00* (2006.01)
(52) U.S. Cl. ................... 713/171; 713/168; 380/278
(58) Field of Classification Search ................... None
See application file for complete search history.

(56) References Cited

U.S. PATENT DOCUMENTS

| 7,073,063 | B2 * | 7/2006 | Peinado ........................ 713/171 |
| 2002/0199009 | A1 * | 12/2002 | Willner et al. ................ 709/231 |

FOREIGN PATENT DOCUMENTS

| CN | 1359081 A | 7/2002 |
| JP | 8-329011 | 12/1996 |
| JP | 2001-184314 | 7/2001 |
| JP | 2001-209696 | 8/2001 |
| JP | 2002-63500 | 2/2002 |
| JP | 2002-112170 | 4/2002 |
| JP | 2002-123415 | 4/2002 |
| JP | 2002-245268 | 8/2002 |
| JP | 2002-261965 | 9/2002 |
| JP | 2002-288449 | 10/2002 |
| JP | 2002-329084 | 11/2002 |

* cited by examiner

*Primary Examiner*—Kaveh Abrishamkar
(74) *Attorney, Agent, or Firm*—Oblon, Spivak, McClelland, Maier & Neustadt, P.C.

(57) ABSTRACT

A content management system according to an example of the invention accepts a storage request including a content ID to identify a content, records reference data which is used to make reference to the content and the content ID in a recording unit in association with each other when the content has been already recorded in the recording unit, and requests the content for a storage request issuer and records the content and the content ID in the recording unit in association with each other when the content is not yet recorded. The content management system accepts an acquisition request including the content ID, reads the content from the recording unit, and distributes the content to an acquisition request issuer.

4 Claims, 8 Drawing Sheets

| User data | | |
|---|---|---|
| User ID | A | |
| Password | | |
| Purchase history dara | Purchase content ID | ----- |
| | Date | ----- |
| Charge data | | |

FIG. 2

| Bookshelf | | |
|---|---|---|
| User ID | A | |
| Content ID or Storage content ID | 0001 | |
| Content | NULL | |
| Content URL | NULL | |
| Content Link | 0080010 | |
| Content provider ID | 1 | |
| ⋮ | ⋮ | |

FIG. 4

CONTENT MANAGEMENT SYSTEM, RECORDING MEDIUM AND METHOD

TECHNICAL FIELD

The present invention relates to a content management system, and a recording medium and method which store a digital content (which will be simply referred to as "content" hereinafter).

BACKGROUND ART

The superdistribution is a scheme which smoothly circulates a content on a network.

In the superdistribution, a content provider delivers an encrypted content encrypted by any method to a user. The content provider or a key manager provides the user with a decryption key which decrypts the encrypted content in addition to the encrypted content. The user is allowed to use the content by purchasing the decryption key.

Usually, in the superdistribution, the content is encrypted and protected. The encrypted content is available at no charge, and can be obtained by any route.

The encrypted content is decrypted in specific software by using the decryption key, and the content is thereby utilized by the user.

The superdistribution assures copyright protection of the content and convenience of the user at the same time, and facilitates circulation of the content. In the superdistribution, the following effects such as those described in (1) to (4) can be obtained.

(1) The electronic circulation enables the content to be rapidly distributed, and dramatically increases circulation of the content as compared with a current situation.

(2) Illegal copying can be avoided, and a right for a content right holder such as a copyright holder of the content can be protected. Since the content is encrypted, the content cannot be utilized unless the decryption key is obtained even if illegal copying is carried out.

(3) A charge for utilizing the content can be reduced. That is, a content utilization fee does not have to be set with an added coverage amount for losses due to illegal copying, a cost required for circulation is also reduced, and hence a utilization fee of the content itself is decreased.

(4) A charge according to a number can be effected, contents can be freely used.

Patent Reference 1 (Jpn. Pat. Appln. KOKAI Publication No. 2002-288449) discloses a technique which downloads a content and then again downloads the content.

In the invention described in Patent Reference 1, a server device and/or a client device holds a purchase record of the once downloaded content. The client device requests downloading the content which exists in the purchase record while making reference to the purchase record, and again downloads the content. The server device refers to the purchase record, and checks the purchase record, and performs the redownload with a counter value which is appropriate for the client side, depending on the redownload request.

Besides, Patent Reference 2 (Jpn. Pat. Appln. KOKAI Publication No. 2002-63500) and Patent Reference 3 (Jpn. Pat. Appln. KOKAI Publication No. 2002-245268) disclose inventions concerning reacquisition of a content.

Further, Patent Reference 4 (Jpn. Pat. Appln. KOKAI Publication No. 2001-184314) discloses a storage device for a purchased content.

In general, a user in the superdistribution stores a content in a user terminal such as a personal computer, or stores the content in a recording medium such as a flexible disk.

However, there are many particulars which can be factors of loss of the content, e.g., defects in a hard disk, problems in an operating system (which will be referred to as an "OS" hereinafter), human errors, theft or loss of the user terminal or the recording medium or natural disasters such as earthquakes or fires, and it is difficult to assuredly store the content.

Therefore, in the superdistribution, when the user loses the content, it is desired that efficient reacquisition of the content is possible without having a lot of labor of the user.

In case of reacquiring the content, there is generally utilized a method by which the user redownloads the content from a site where he/she has downloaded the same before or the user uses any search engine to find and redownload the lost content.

However, it is difficult to efficiently reacquire the content by this method.

For example, even if the user again accesses the site from which he/she has downloaded the content before, it is not guaranteed that he/she can rapidly find and redownload the content. That is because provision of the content has already come to an end, for example.

Furthermore, in cases where the search engine is used, a searching operation itself is a burden to the user, it takes time for the user to immediately find the lost content due to the influence of search noises or the like, and reacquisition of the content is difficult in some cases.

Patent References 1 to 4 mentioned above describe reacquisition and storage of the content. However, these references do not describe a scheme in which the user edits a once-acquired content and saves and reacquires the edited content in the superdistribution.

For example, in regard to the content such as a newspaper, a magazine (a weekly magazine) or the like, although the user does not have to save the entire content after reading, he/she may want to pick up and use an article in the content in some cases. In such a case, if the entire content is saved in a server, a capacity of the server becomes enormous, which may be a factor of occurrence of an error in the server.

Moreover, saving the entire content and again performing an editing operation such as a selecting a part of the content may be possibly an infringement of a right, e.g., a copyright concerning the content. Therefore, there is required a scheme which avoids an infringement to the right concerning content and enables reacquisition of the edited content.

Although the content provided to the user terminal is stored in the server or the like in Patent References 1 to 4, the same content is recorded with respect to each user even if the same content is acquired by a plurality of users. Therefore, there may be a case in which overlap of contents recorded in the server occurs and a capacity of the server becomes enormous, which leads to generation of an error in the server. In particular, this problem becomes more serious as the number of users and the number of contents to be distributed to users are increased.

In view of the above-described problems, it is an object of the present invention to provide a content management system, and a recording medium and method which reduce a number and capacity of contents to be stored, easily and rapidly reacquire content and make storage of the contents more efficient.

DISCLOSURE OF INVENTION

A content management system according to the first example of the invention comprises a first acceptance unit which accepts a storage request including a content ID to identify a content, a storage unit which, based on the storage request, records reference data which is used to make reference to the content and the content ID in a recording unit in association with each other when the content has been already recorded in the recording unit, and records the content and the content ID in the recording unit in association with each other when the content is not yet recorded, a second acceptance unit which accepts an acquisition request including the content ID, a unit which reads the content from the recording unit based on the acquisition request, and a unit which distributes the content read based on the acquisition request to an acquisition request issuer.

A content management system according to the second example of the invention comprises a unit which accepts a storage request including change content obtained by changing content whose utilization restriction is released by right data and a content ID to identify the content, a unit which, based on the storage request, makes reference to a recording unit which records utilization restricting data used to restrict the utilization of the content and the content ID in association with each other to create a storage content obtained by restricting the use of the change content by using the utilization restricting data, a storage unit which issues a storage content ID to identify the storage content, provides a storage request issuer with the storage content ID, and records in the recording unit the storage content ID and the storage content in association with each other, a unit which accepts an acquisition request including the storage content ID, a unit which reads the storage content from the recording unit based on the acquisition request, and a unit which distributes the storage content read based on the acquisition request to an acquisition request issuer.

A content management system according to the third example of the invention comprises a unit which accepts a storage request including a content ID to identify a content whose utilization restriction is released by right data and positional data of a partial content as a part of the content with respect to the content, a unit which, based on the storage request, makes reference to a recording unit which records utilization restricting data used to restrict the use of the content, the content ID and the content in association with each other to create a partial content from the content and the positional data and create a storage content obtained by restricting the use of the partial content by using the utilization restricting data, a storage unit which issues a storage content ID to identify the storage content, provides a storage request issuer with the storage content ID, and records the storage content ID and the storage content in the recording unit in association with each other, a unit which accepts an acquisition request including the storage content ID, a unit which reads the storage content from the recording unit based on the acquisition request, and a unit which distributes the storage content read based on the acquisition request to an acquisition request issuer.

A user system according to the fourth example of the invention comprises a unit which provides a content management system which stores a content with a storage request including a content ID to identify the content, a unit which accepts a request for the content from the content management system and provides the content management system with the content when the content management system does not yet record the content based on the storage request, a unit which provides the content management system with an acquisition request including the content ID, and a unit which accepts the content from the content management system in accordance with the acquisition request.

A user system according to the fifth example of the invention comprises a unit which creates a change content obtained by changing a content whose utilization restriction is released by right data in accordance with an instruction from a user, a unit which provides a content management system which stores the content with a storage request including a content ID to identify the content and the change content, a unit which accepts from the content management system a storage content ID to identify the storage content obtained by restricting the use of the change content by using utilization restricting data which is used to restrict the use of the content, a unit which provides the content management system with an acquisition request including the storage content ID, and a unit which accepts the storage content from the content management system in accordance with the acquisition request.

BRIEF DESCRIPTION OF DRAWINGS

FIG. 2 is a view showing an example of user data.

FIG. 4 is a view showing an example of a bookshelf.

BEST MODE FOR CARRYING OUT THE INVENTION

Embodiments according to the present invention will now be described hereinafter with reference to the accompanying drawings.

First Embodiment

In this embodiment, a description will be given as to a case where right data is a decryption key. It is to be noted that the right data may be any other data, e.g., a password which cancels a utilization restriction.

In this embodiment, it is determined that the decryption key is stored in a storage medium such as an SD memory card, and the decryption key is not lost even if a user loses a content.

In a content distribution system according to this embodiment, it is determined that distribution of the decryption key is charged but distribution of an encrypted content is not charged.

In the superdistribution, a user terminal decrypts the encrypted content by using the decryption key, and utilizes/manages a decrypted content. However, the user may lose the content or the user terminal for the above-described various reasons.

In this embodiment, the user who has lost the content or user terminal but still has the decryption key is allowed to reacquire and reutilize the content while reducing labor of the user.

In this embodiment, although a description will be given as to an example where a key manager carries out a content management service, the key manager and a content manager who carries out the content management service may be different persons.

A content management system which is run by the key manager carries out a content repository service for storing a content owned by the user, and realizes reacquisition involved by loss of the content.

The content management system stores an encrypted content in accordance with a storage request from the user terminal. The user terminal accepts the encrypted content stored in the content management system, decrypts the content by using the decryption key owned by the user, and reutilizes the decrypted content.

For example, the content management system encrypts a partial content which is a part (a clip of content) of the content to create a storage content, and stores the storage content. Additionally, the user terminal acquires the storage content, decrypts the storage content with the decryption key owned by the user, and reutilizes the decrypted content.

A content viewer of the user terminal automatically requests storage of the encrypted content or partial content with respect to the content management system at the time of occurrence of a predetermined event such as acquisition of the content, acceptance of an instruction from the user, elapse of a predetermined time and others.

In the case of keeping the same contents from different users, the content management system eliminates overlap.

The user terminal realizes a change (editing) of the content which does not infringe on rights such as a copyright concerning the content.

Figure 1:
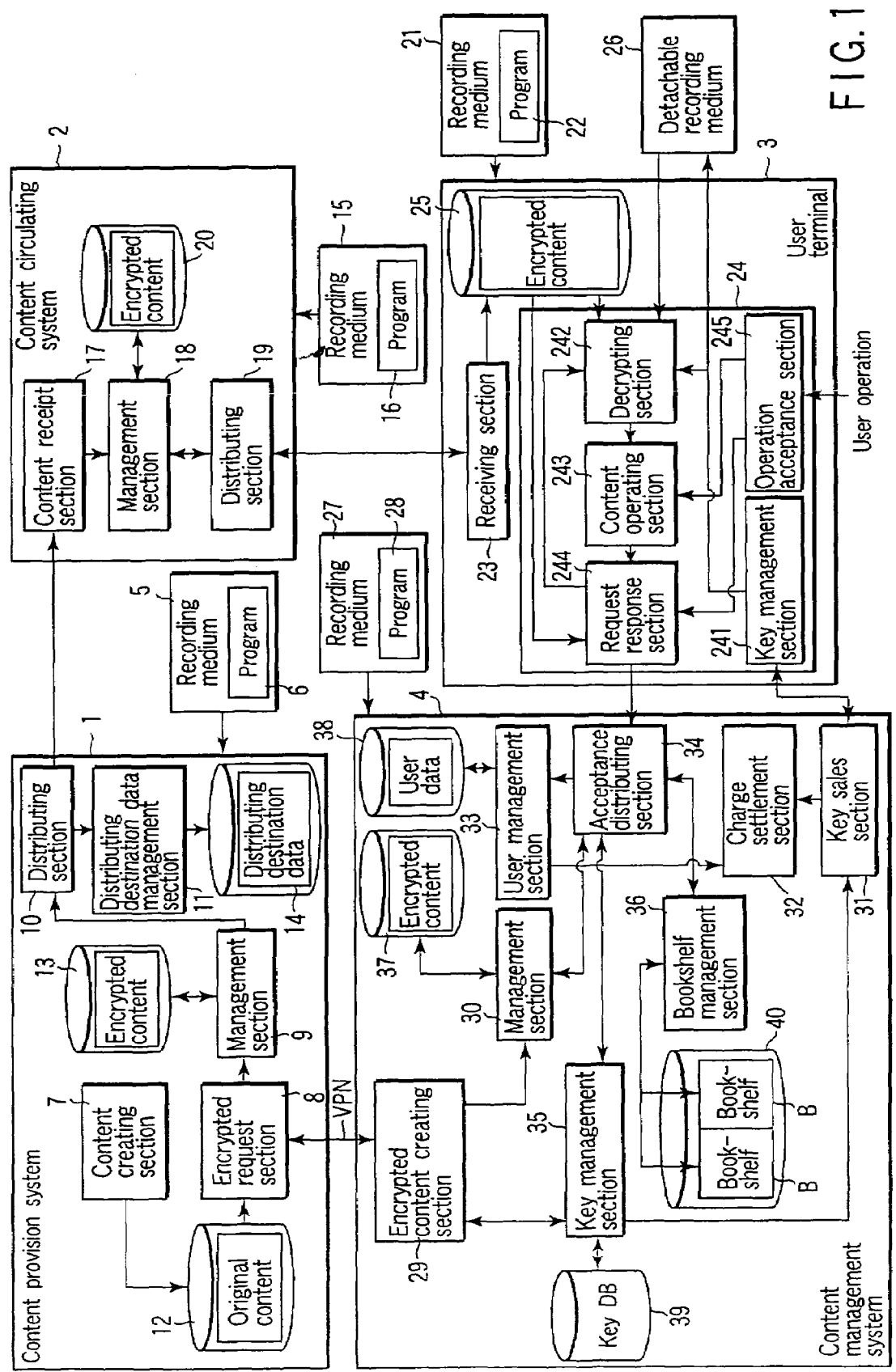
FIG. 1 is block diagram showing an example of a content distribution system according to the first embodiment of the invention.

FIG. 1 is a block diagram showing an example of the content distribution system according to this embodiment.

The content distribution system according to this embodiment comprises: a content provision system 1 which is run by a content provider (a publishing company); a content circulating system 2 which is run by a content circulator (a bookseller); the user terminal 3 which is operated by the user; and the content management system 4 which is run by the key manager.

The content provision system 1 creates the content or accept created content, and requests the content management system 4 to create the encrypted content through an encryption request section 8. Then, the content provision system 1 distributes the encrypted content accepted from the content management system 4 to the content circulating system 2.

The content circulating system 2 distributes or automatically distributes the encrypted content to the user terminal 3 in response to a request from the user terminal 3.

The user terminal 3 purchases from the content management system 4 the decryption key which is required to utilize the accepted encrypted content, and stores the purchased decryption key in a detachable recording medium 26 such as an SD memory card or a flexible disk.

Further, the user terminal 3 dispatches a storage request to the content management system 4, and transmits the encrypted content or partial content which should be stored to the content management system 4 as required.

In the case of acquiring the encrypted content or partial content stored in the content management system 4, the user terminal 3 dispatches an acquisition request, accepts the encrypted content or storage content obtained by encrypting the partial content from the content management system 4, and decrypts the encrypted content or the storage content with the decryption key stored in the detachable recording medium 26, thereby making the decrypted content available.

The content management system 4 creates the encryption key which is used to encrypts the content in a key management section 35 in accordance with an encryption request from the content provision system 1, encrypts the content by using this encrypted key, and returns the encrypted content to the content provision system 1.

Furthermore, the content management system 4 reads the encryption key from the key management section 35 in accordance with a partial content storage request, and stores the storage content obtained by encrypting the partial content with this encrypted key. The generated encrypted key is managed in the key management section 35.

The encrypted content or the storage content may be managed in a management section 30, or managed in a bookshelf management section 36.

The content management system 4 takes out the decryption key by using the key management section 35 in accordance with a decryption key request (a right purchase request) from the user terminal 3, distributes the decryption key to the user terminal 3, and performs charging, settlement and profit sharing.

The content management system 4 judges a storage request for encrypted content or partial content in accordance with a storage request from the user terminal 3. The content management system 4 stores the encrypted content without overlap in case of a storage request for the encrypted content, and stores the storage content obtained by encrypting the partial content in a recording device which serves as a library 40 in case of a storage request for the partial content.

The content management system 4 takes out the encrypted content or storage content from the library 40 and distributes the content in accordance with an acquisition request from the user terminal 3.

Configurations of the respective systems 1, 2 and 4 and the user terminal 3 will now be described hereinafter.

The content provision system 1 reads and executes a program 6 recorded in a recording medium 5, thereby realizing functions as a content creating section 7, the encryption request section 8, a management section 9, a distributing section 10 and a distribution destination data management section 11. Furthermore, the content provision system 1 comprises recording devices 12 to 14.

The content creating section 7 creates the content (original content), or accepts the created content, associates the content with a content ID which identifies the content, and records them in the recording device 12.

The encryption request section 8 acquires the content and the content ID associated with the content from the recording device 12, provides the content and the content ID to the content management system 4 by using, e.g., a VPN (Virtual Private Network), and accepts the encrypted content as a response.

It is to be noted that the content ID may be issued by the content provision system 1, the content ID issued by the content management system 4 may be accepted and used by the content provision system 1. Moreover, although the content ID is data which identifies the content, it may be data which identifies the encrypted content obtained by encrypting the content.

The management section 9 associates the encrypted content with the content ID, records them in the recording device 13, and provides them to the distributing section 10.

The distributing section 10 provides the encrypted content and the content ID to an arbitrary user terminal or an arbitrary content circulating system. This FIG. 1 shows an example where the distributing section 10 provides the encrypted content to the content circulating system 2. Additionally, the distributing section 10 provides distribution destination data indicative of a distribution destination of the encrypted content to the distribution destination data management section 11.

The distribution destination data management section 11 records the distribution destination data accepted from the distributing section 10 in the recording device 14.

The content circulating system 2 reads and executes a program 16 recorded in a recording medium 15, thereby realizing functions as a contents receipt section 17, a management section 18 and a distributing section 19. Further, the content circulating system 2 comprises a recording device 20.

The content receipt section 17 accepts the encrypted content and content ID from the content provision system 1, and provides them to the management section 18.

The management section 18 associates the encrypted content with the content ID, records them in the recording device 20, and reads the encrypted content and the content ID from the recording device 20.

The distributing section 19 provides the encrypted content to another content circulating system or an arbitrary user terminal in accordance with a content request including the contents ID accepted from the other content circulating system or the arbitrary user terminal. The FIG. 1 shows an example where the distributing section 19 provides the encrypted content to the user terminal 3.

The user terminal 3 reads and executes a program 22 recorded in a recording medium 21, thereby realizing functions as a receiving section 23 and a viewer 24. Moreover, the user terminal 3 comprises a recording device 25. The user terminal 3 records the decryption key accepted from the content management system 4 in a detachable recording medium 26, and reads the decryption key from the detachable recording medium 26.

The receiving section 23 provides a content request to the content circulating system 2, accepts the encrypted content as a response to this request, associates the encrypted content and the contents ID, and records them in the recording device 25.

The viewer 24 edits the content. The user can perform an editing operation such as clipping with respect to the content in the viewer 24 only, and provides the encrypted content or partial content which should be stored to the content management system 4 through the viewer 24. The edited partial content becomes a plain text which is not encrypted, and hence a copyright protection technique is applied. Therefore, in this embodiment, an edition result cannot be transmitted to the outside of the viewer 24, and the user performs an editing operation in the viewer 24 only.

The viewer 24 applies a confidential communication technique, e.g., a VPN as well as a regular communication technique in order to communicate with another system, thereby transmitting the edited content. Using a confidential communication network can avoid wiretapping or arrogation even if a changed content is transmitted as a plain text.

The viewer 24 stores the content automatically or in accordance with an instruction from the user. For example, in the case of subscription to a newspaper or a magazine or sequential purchase of books in series, it is troublesome for the user to do the storage procedure and ask for storage every time. Therefore, the user registers a book title, a magazine title, an article title or a column title in the viewer 24 in advance. The viewer 24 automatically stores the content in the content management system 4 in accordance with occurrence of a predetermined event such as completion of acquisition and purchase of the content.

The viewer 24 has functions as a regular viewer, e.g., decryption and reproduction of the encrypted content and others.

For example, the viewer 24 comprises a key management section 241, a decrypting section 242, an operation accepting section 245, a content operating section 243, a request response section 244.

The key management section 241 provides a key request including a content ID from the user to the content management system 4, accepts the decryption key corresponding to the content ID, and records the decryption key in a detachable recording medium 26.

The decrypting section 242 fetches the decryption key corresponding to the content ID from the detachable recording medium 26 or accepts the decryption key from the key management section 241, and decrypts the encrypted content by using this decryption key.

The operation accepting section 245 accepts, e.g., a key acquiring instruction, a content storage instruction, a content acquiring instruction, a content change instruction and others from the user, and notifies the key management section 241, the request response section 244 or the content operating section 243 as an instruction target of an instruction content.

The content operating section 243 accepts the content encrypted by the decrypting section 242, and changes the content in accordance with the change instruction from the user. In this embodiment, as an example of change, a part of the content is clipped to create the partial content.

The request response section 244 provides various kinds of requests for a content management, e.g., a storage request or a acquisition request to the content management system 4. Further, in this embodiment, the request response section 244 automatically provides the storage request concerning a previously registered content ID to the content management system 4 in accordance with occurrence of a predetermined event.

Furthermore, in the cases where the content management system 4 does not have the encrypted content or partial content as a storage target, the request response section 244 accepts a request for the encrypted content or the partial content as the storage target from the content management system 4, and provides the encrypted content or the partial content in accordance with this request.

The content management system 4 distributes the decryption key and provides a content storage service.

The content management system 4 reads and executes a program 28 recorded in a recording medium 27, thereby realizing functions as an encrypted content creating section 29, a management section 30, a key sales section 31, a charge settlement section 32, a user management section 33, an acceptance distributing section 34, a key management section 35 and a bookself management section 36. Moreover, the content management system 4 comprises recording devices 37 to 39 and a library 40.

When the encrypted content creating section 29 accepts an encryption request from the content provision system 1, it provides the content and the content ID thereof to the key management section 35, requests encryption, and accepts the encrypted content generated by the key management section 35.

Then, the encrypted content creating section 29 provides the encrypted content and the content ID to the management section 30, and returns the encrypted content to the content provision system 1.

The management section 30 records in the recording device 37 the encrypted content and the content ID in association with each other, and reads the encrypted content from the recording device 37 based on the content ID.

The key sales section 31 accepts a key request including the content ID from the key management section 241 of the viewer 24, notifies the key management section 35 of the key request, and accepts from the key management section 35 the decryption key fetched by the key management section 35 based on the content ID included in the key request. Additionally, the key sales section 31 provides the decryption key to the viewer 24, and provides a settlement request to the charge settlement section 32.

The charge settlement section 32 reads user data managed by the user management section 33 based on the settlement request, executes charge processing and updates the user data. Charge data and purchase history data are recorded in the user data in accordance with each user ID.

The user management section 33 authenticates the user based on the user ID and the user data recorded in the recording device 38. For example, if the user ID matches with a password, a request of the user is approved.

Further, the user management section 33 provides the user data to the charge settlement section 32, and accepts and records user data in which charge data and purchase history data are updated.

FIG. 2 is a view showing an example of user data.

When the acceptance distributing section 34 accepts a storage request from the request response section 244 of the viewer 24, it performs an operation for storing the encrypted content or partial content in cooperation with the user management section 33, the management section 30, the key management section 35 and the bookshelf management section 36.

Furthermore, upon accepting an acquisition request from the request response section 244 of the viewer 24, the acceptance distributing section 34 carries out an operation of distributing the encrypted content or storage content obtained by encrypting the partial content in cooperation with the user management section 33, and the bookshelf management section 36.

The key management section 35 accepts a key issue request from the encrypted content creating section 29, issues the encryption key and the decryption key, encrypts the content, and records in the recording device 39 the encryption key, the decryption key and the content ID in association with each other, and manages data recorded in the recording device 39. Moreover, the key management section 35 provides the encrypted content to the encrypted content creating section 29.

The bookshelf management section 36 manages a bookshelf (data) B in a library 40 (a repository) in order to perform storage of the content without overlap, and reads the content corresponding to the content ID from the library 40.

Figure 3:
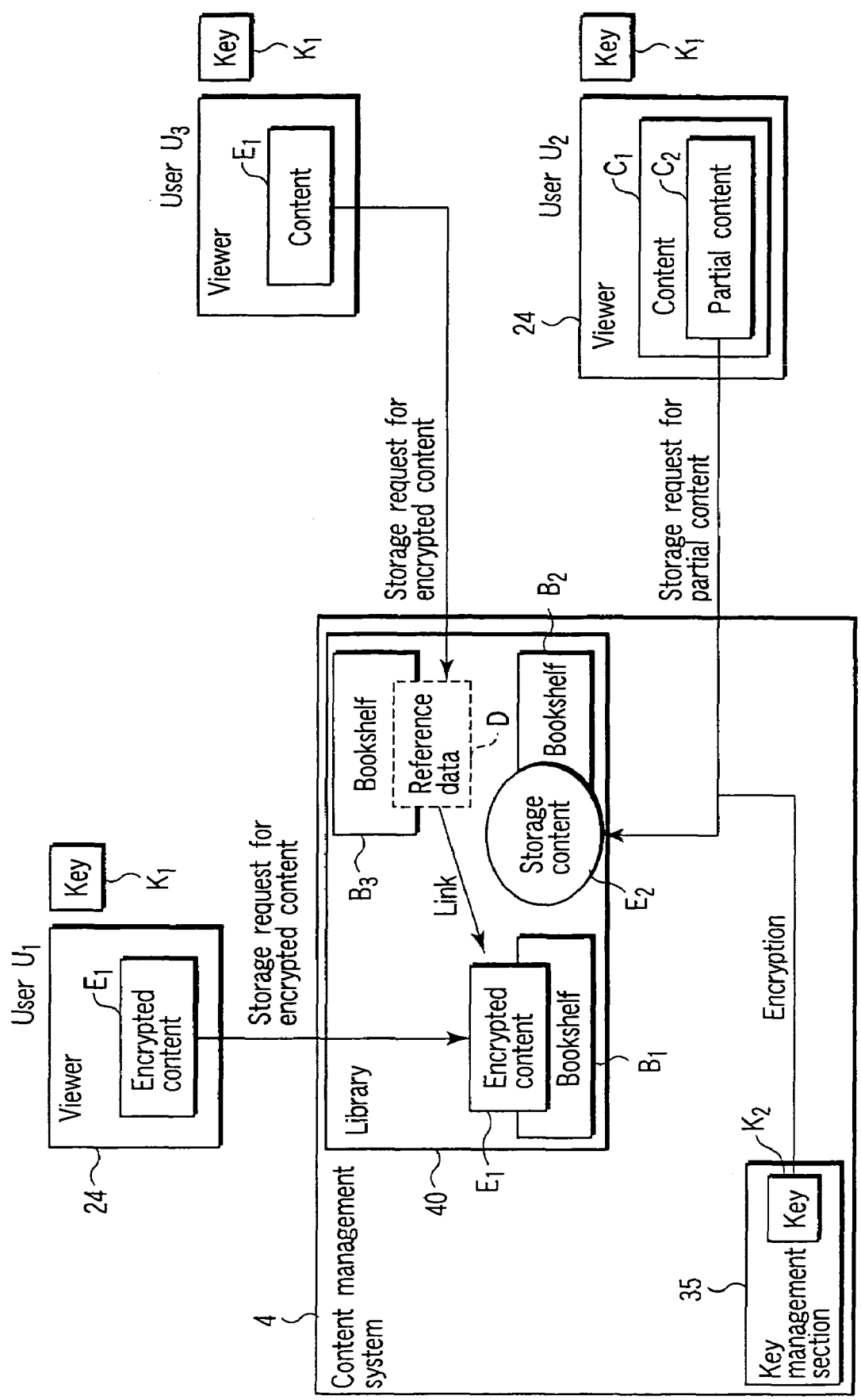
FIG. 3 is a block diagram showing a schematic example of an operation of storing an encrypted content or partial content.

FIG. 3 is a block diagram showing a schematic example of an operation of storing an encrypted content or partial content. In FIG. 3, an encrypted content $E_1$ is obtained by encrypting a content $C_1$, and a storage content E2 is obtained by encrypting a partial content $C_2$.

In the first place, in case of storing the content $C_1$ owned by a user $U_1$ in the content management system 4, the request response section 244 of the viewer 24 operated by the user $U_1$ provides a storage request including a user ID and a content ID to the content management system 4.

The content management system 4 accepts the storage request in the acceptance distributing section 34, authenticates the user in the user management section 33, and judges whether the encrypted content $E_1$ obtained by encrypting the content $C_1$ exists in the content management system 4 by using the bookshelf management section 36 and the management section 30.

Here, since the encrypted content $E_1$ does not exist in the content management system 4, the content management system 4 requests the encrypted content $E_1$ to the user terminal 3 operated by the user $U_1$ from the acceptance distributing section 34.

The viewer 24 operated by the user $U_1$ accepts the request for the encrypted content $E_1$ by the request response section 244, and transmits the encrypted content $E_1$ to the content management system 4. It is to be noted that the user $U_1$ has a decryption key $K_1$ which decrypts the encrypted content $E_1$.

The content management system 4 receives the encrypted content $E_1$ by the acceptance distributing section 34, provides a bookshelf $B_1$ of the user $U_1$ in the library 40 by the bookshelf management section 36, and stores the encrypted content $E_1$.

In the second place, a user $U_2$ performs an editing operation in the viewer 24 in which the content $C_1$ can be edited to effect editing, e.g., clipping with respect to the content $C_1$, and instructs to store a partial content $C_2$ which is a part of the content $C_1$ in the content management system 4.

In this case, the viewer 24 operated by the user $U_2$ utilizes the request response section 244 to transmit a storage request including the partial contents $C_2$, a user ID and a content ID to the content management system 4. It is to be noted that the user $U_2$ has a decryption key $K_1$ which decrypts the encrypted content $E_1$.

It is determined that the viewer 24 is a dedicated terminal or software having sufficient tamper resisting properties. In this case, the partial content $C_2$ is converted into a plain text and may be possibly wiretapped or arrogated, and hence it is transmitted by confidential means such as a VPN.

Further, if the content management system 4 can obtain an archive of the encrypted content $E_1$ (it has the archive, or it knows where the archive exits and hence can obtain it), it is good enough for the viewer 24 to transmit positional data of a clipped part in the content $C_1$.

However, if additional data such as a comment is added to the clipped part by the user $U_2$, the viewer 24 transmits the partial contents $C_2$ itself.

The content management system 4 uses the acceptance distributing section 34 to accept the storage request from the user terminal 3 operated by the user $U_2$, authenticates the user in the user management section 33, uses the key management section 35 (the content management system 4 may or may not comprise this section) to read an encryption key $K_2$ which has encrypted the entire content $C_1$ with respect to the partial content $C_2$, creates a storage content $E_2$ by encrypting the partial content $C_2$ by using the encryption key $K_2$, and stores the created content in a bookshelf $B_2$ of the user $U_2$ by the bookshelf management section 36.

When positional data is transmitted to the content management system 4 from the user terminal 3 operated by the user $U_2$ in place of the partial content $C_2$, the content management system 4 obtains the content $C_1$ by using the key management section 35, edits the content $C_1$ based on the positional data to obtain the partial content $C_2$, encrypts the partial content $C_2$ by using the encryption key $K_2$ to create the storage content $E_2$, and stores the storage content $E_2$ in the bookshelf $B_2$ of the user $U_2$ by using the bookshelf management section 36.

It the third place, when a user $U_3$ stores the same content $C_1$ as those of the user $U_1$ in the content management system 4, the user terminal 3 operated by the user $U_3$ transmits a storage request including a user ID and a content ID to the content management system 4.

The content management system 4 accepts the storage request by the acceptance distributing section 34, authenticates the user in the user management section 33, and judges whether the encrypted content $E_1$ obtained by encrypting the content $C_1$ exists in the content management system 4 by using the bookshelf management section 36 and the management section 30.

The content management system 4 recognizes that the user $U_1$ has already deposited the encrypted content $E_1$ based on a judgment result in the bookshelf management section 36 and the management section 30, stores in a bookshelf $B_3$ of the user $U_3$ reference data D which is used to perform association, e.g., linking from the bookshelf $B_3$ of the user $U_3$ to the encrypted content $E_1$ included in the bookshelf $B_1$ of the user $U_1$ by using the bookshelf management section 36 since overlapping storage is not good in terms of cost performance, thereby avoids overlap, and stores the content.

FIG. 4 is a view showing an example of a data structure of the bookshelf B. In this bookshelf B, a content ID or a storage content ID is recorded with respect to a user ID. Further, an encrypted content or storage content corresponding to a content ID or a storage content ID is recorded, or reference data (e.g., a link or URL) which is used to make reference to the encrypted content or storage content is recorded.

Figure 5:
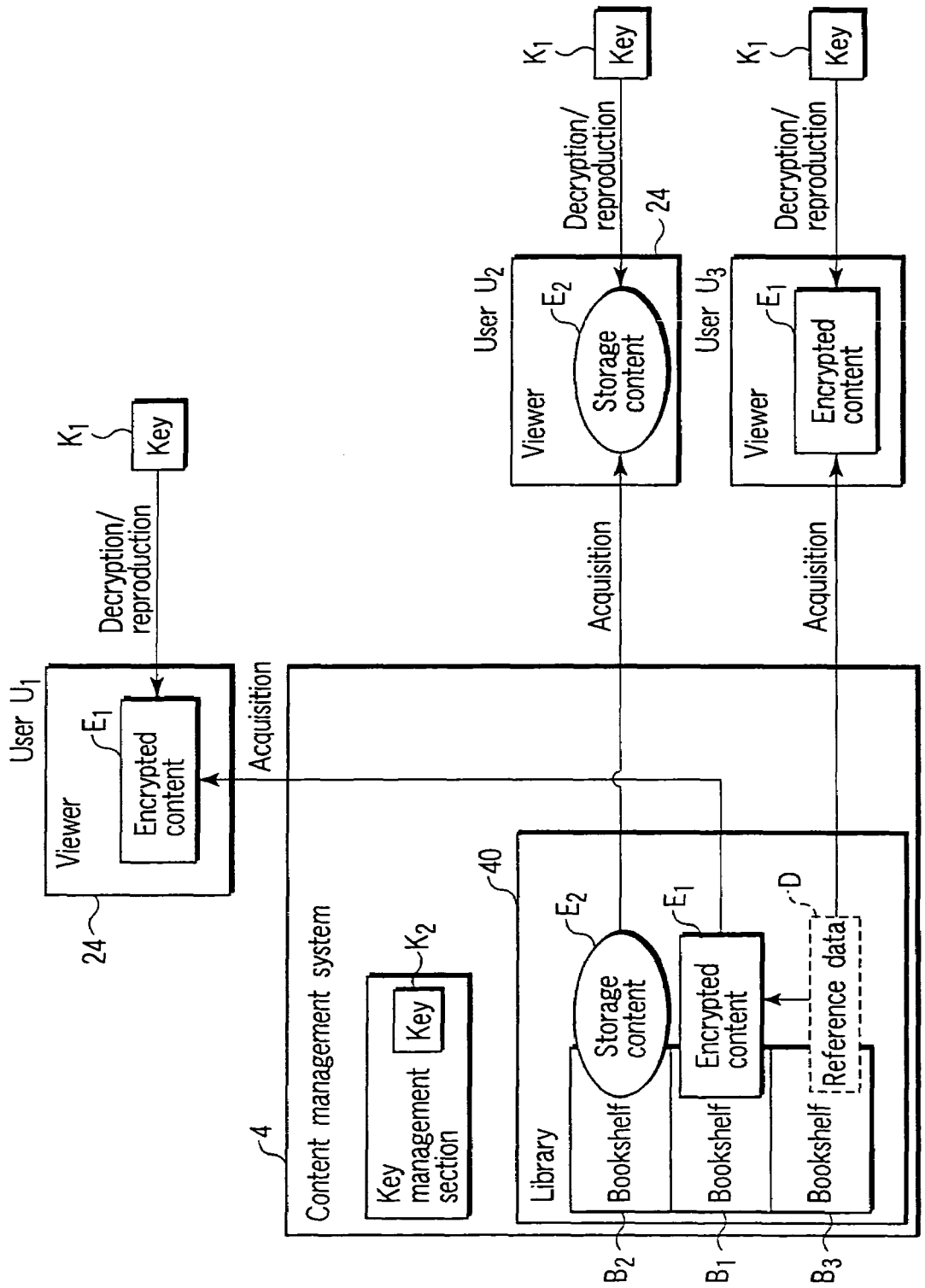
FIG. 5 is a block diagram showing a schematic example of an operation of acquiring an encrypted content and partial content.

FIG. 5 is a block diagram showing a schematic example of an operation of acquiring the encrypted content and partial content.

At first, the user terminal 3 operated by the user $U_1$ issues an acquisition request for the content $C_1$ to the content management system 4.

The content management system 4 accepts the acquisition request in the acceptance distributing section 34, authenticates the user in the user management section 33, reads the encrypted content $E_1$ existing in the bookshelf $B_1$ of the user $U_1$ in the bookshelf management section 36, and returns the read encrypted content $E_1$ by using the acceptance distributing section 34. Since the user $U_1$ has the decryption key $K_1$, he/she can decrypt the encrypted content $E_1$ to use the content $C_1$.

At second, the user terminal 3 operated by the user $U_2$ requests the content management system 4 to acquire partial content $C_2$.

The content management system 4 accepts the acquisition request in the acceptance distributing section 34, authenticates the user in the user management section 33, reads the storage content $E_2$ (content obtained by encrypting the partial content $C_2$) existing in the bookshelf $B_2$ of the user $U_2$ by using the bookshelf management section 36, and returns the read storage content $E_2$.

The storage content $E_2$ has been encrypted in such a manner that it can be decrypted by using the decryption key $K_1$. Therefore, if the user $U_2$ has the decryption key $K_1$ which decrypts the encrypted content $E_1$, he/she can decrypt the storage content $E_2$ to utilize the partial content $C_2$.

At third, the user terminal 3 operated by the user $U_3$ issues an acquisition request for the content $C_1$ to the content management system 4.

The content management system 4 accepts the acquisition request in the acceptance distributing section 34, authenticates the user in the user management section 33, reads the encrypted content $E_1$ based on reference data D provided in the bookshelf $B_3$ of the user $U_3$ by using the bookshelf management section 36, and returns the read encrypted content $E_1$ by using the acceptance distributing section 34. Since the user $U_3$ has the decryption key $K_1$, he/she can decrypt the encrypted content $E_1$ to use the content $C_1$.

Operations of the user terminal 3 and the content management system 4 according to this embodiment will now be described hereinafter in detail.

Figure 6:
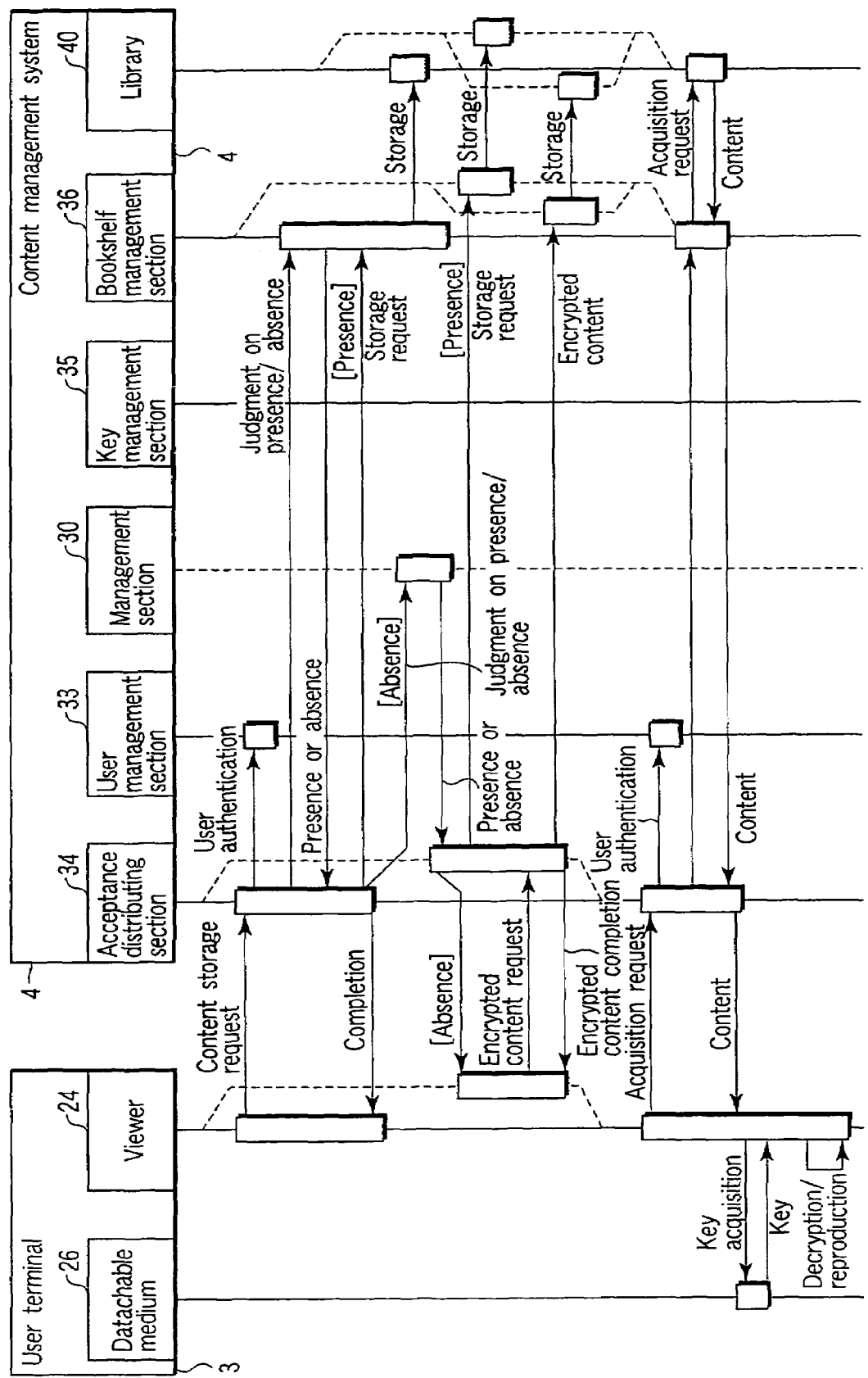
FIG. 6 is a sequence diagram showing an example of operations of a user terminal and content management system for storage and acquisition of an encrypted content.

FIG. 6 is a sequence diagram showing an example of operations of the user terminal 3 and the content management system 4 for storage and acquisition of the encrypted content.

It is assumed that the user has already acquired encrypted content from the content circulating system 2, and obtained the decryption key which is used to decrypt the acquired encrypted content from the content management system 4.

The request response section 244 of the viewer 24 in the user terminal 3 provides a storage request including the user ID and the content ID to the content management system 4 at the time of occurrence of a predetermined event.

The acceptance distributing section 34 in the content management system 4 accepts the storage request, and the user management section 33 authenticates the user by using the user ID.

The acceptance distributing section 34 asks the bookshelf management section 36 to judge whether the encrypted content as a target of the storage request exist in the bookshelf 40.

The bookshelf management section 36 judges whether the encrypted content exist in the bookshelf 40 by using the content ID, and notifies the acceptance distributing section 34 of a result.

If the encrypted content exist in the bookshelf 40, the acceptance distributing section 34 provides the storage request to the bookshelf management section 36, and the bookshelf management section 36 records reference data for the recorded encrypted content in the bookshelf B of the user based on the storage request, thereby storing the content.

If the encrypted content do not exist in the bookshelf 40, the acceptance distributing section 34 inquires the management section 30 about existence of the encrypted content in the recording device 37 by using the content ID.

The management section 30 judges whether the encrypted content corresponding to the content ID exist in the recording device 37, and notifies the acceptance distributing section 34 of a result.

If the encrypted content exist in the recording device 37, the acceptance distributing section 34 provides a storage request to the bookshelf management section 36, and the bookshelf management section 36 records in the bookshelf B of the user reference data which is used to make reference to the encrypted data recorded in the recording device 37, thereby storing the content.

If the encrypted data does not exist in the recording device 37, the acceptance distributing section 34 requests the viewer 24 for the encrypted content.

The request response section 244 of the viewer 24 accepts the request for the encrypted content, and provides the encrypted content to the content management system 4 in response to this request.

The acceptance distributing section 34 provides the bookshelf management section 36 with the encrypted content.

The bookshelf management section 36 records the encrypted content in the bookshelf B of the user based on a storage request, thereby storing the content.

Here, it is assumed that the user has lost the encrypted content and reacquires the encrypted content.

The request response section 244 of the viewer 24 provides the content management system 4 with an acquisition request including the user ID and the content ID.

The acceptance distributing section 34 accepts the acquisition request, and the user management section 33 authenticates the user by using the user ID.

The acceptance distributing section 34 notifies the bookshelf management section 36 of the acquisition request.

The bookshelf management section 36 reads the encrypted content from the library 40 by using the content ID, or reads it from the library 40 or the recording device 37 based on the reference data, and provides the acceptance distributing section 34 with the read encrypted content.

The acceptance distributing section 34 provides the viewer 24 with the read encrypted content.

The request response section 244 of the viewer 24 accepts the encrypted content from the content management system 4 and provides the decrypting section 242 with the encrypted content, and the decrypting section 242 fetches the decryption key from the detachable recording medium 26 and decrypts and reproduces the encrypted content.

Figure 7:
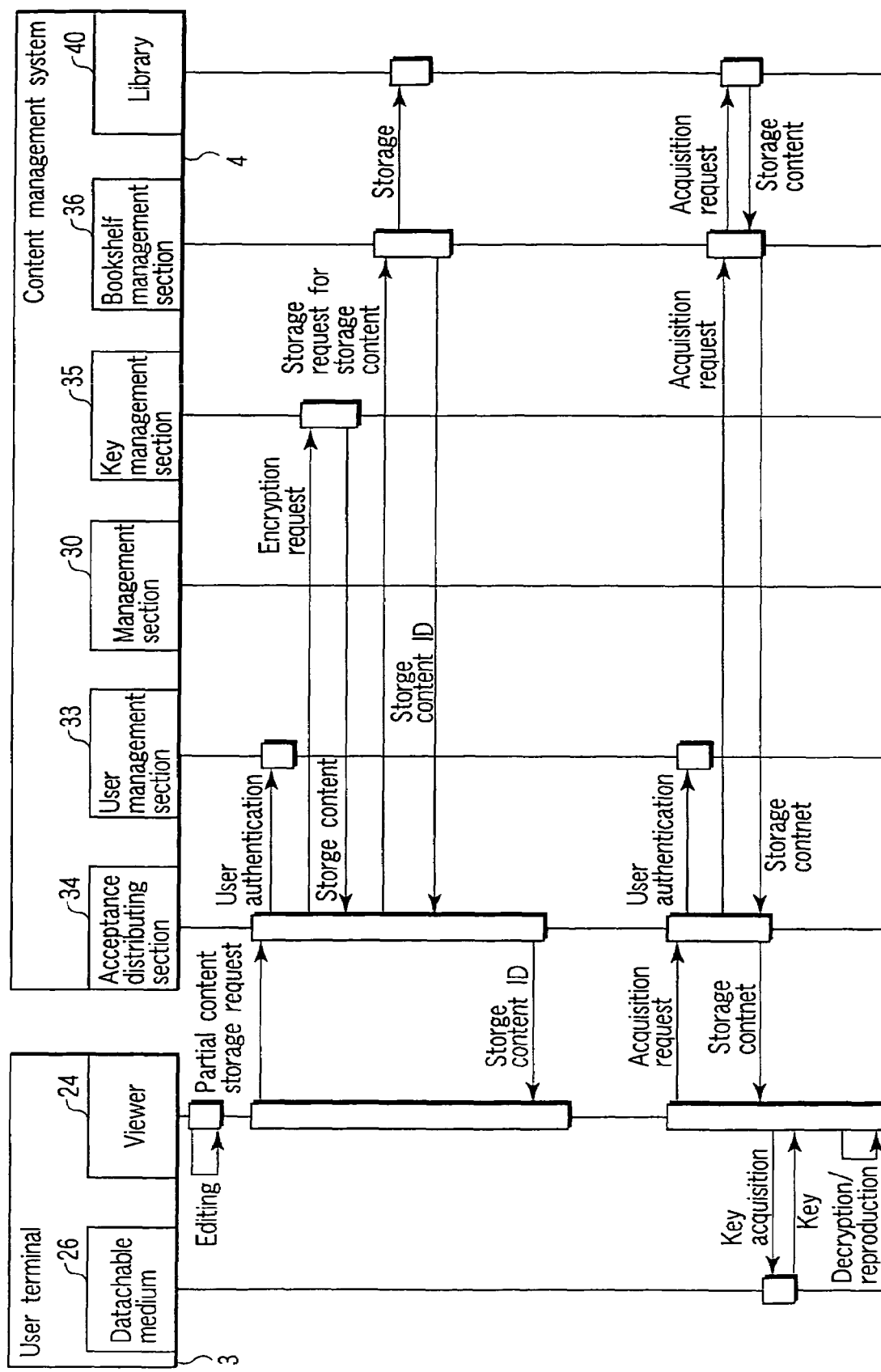
FIG. 7 is a sequence diagram showing an example of operations of an user terminal and content management system for storage and acquisition of a partial content.

FIG. 7 is a sequence diagram showing an example of operations of the user terminal 3 and the content management system 4 for storage and acquisition of the partial content.

The content operating section 243 of the viewer 24 performs editing, e.g., clipping with respect to the content in accordance with an operation by the user, and the request response section 244 provides the content management system 4 with a storage request including the partial content obtained as a result of editing, the user ID and the content ID by using a confidential communication technique such as a VPN.

The acceptance distributing section 34 of the content management system 4 receives the storage request, and the user management section 33 authenticates the user by using the user ID.

The acceptance distributing section 34 of the content management system 4 judges whether the accepted storage request is a storage request for the content or a storage request for the partial content. Here, since the storage request is a storage request for the partial content, the content management system 4 must encrypt this partial content and then store it.

Thus, the acceptance distributing section 34 notifies the key management section 35 of the content ID and the partial content and asks this section 35 for encryption processing.

The key management section 35 acquires an encryption key used for encryption of original contents from the recording device 39 (a key database), and encrypts the partial content by using the encryption key.

The key management section 35 returns the storage content obtained by encrypting the partial content to the acceptance distributing section 34.

When the acceptance distributing section 34 receives the storage content, it requests the bookshelf management section 36 to store the storage content.

The bookshelf management section 36 newly issues a storage content ID, stores the storage content, and returns the storage content ID to the acceptance distributing section 34.

The acceptance distributing section 34 returns the storage content ID to the request response section 244 of the viewer 24.

In this example, it is assumed that the user has lost partial content and acquires the partial content.

The request response section 244 of the viewer 24 provides the content management system 4 with an acquisition request for the storage content including the user ID and the storage content ID.

The acceptance distributing section 34 of the content management system 4 receives the acquisition request, and judges whether the acquisition request is a request for the encrypted content or a request for the storage content.

The user management section 33 authenticates the user by using the user ID.

The acceptance distributing section 34 notifies the bookshelf management section 36 of the acquisition request.

The bookshelf management section 36 fetches the storage content by using the storage content ID, and returns the storage content to the acceptance distributing section 34.

The acceptance distributing section 34 provides the request response section 244 of the viewer 24 with the storage content.

The request response section 244 of the viewer 24 accepts the storage content from the content management system 4 and provides the decrypting section 242 with the storage content. The decrypting section 242 fetches the decryption key from the detachable recording medium 26 and decrypts and reproduces the storage content.

As described above in detail, in this embodiment, the number of contents to be stored can be reduced, and the content can be easily and rapidly reacquired, thereby increasing the efficiency of storage of contents.

The user can assuredly store his/her content in preparation for various hazards. Even if the user loses the content, he/she can acquire and utilize the lost content without repurchasing the decryption key or an amount of money comparable to a commission charge as long as he/she has right data such as the decryption key.

Furthermore, the user can perform the content editing, e.g., clipping in the viewer 24, thereby increasing the convenience.

The key manager can carry out collection of a library service fee, collection of a reacquisition commission fee or collection of a membership fee as a storage server for members, and hence profits are increased, thereby assuredly amassing users.

Even if the content is edited by the user, this operation is carried out in the viewer 24 only, and hence the content provider can avoid prejudice toward rights such as a copyright concerning the content, e.g., illegal copy or reprint of the content.

Moreover, the content provider can hold a council with the key manager in relation to reacquisition of the content and collect a fixed commission fee from the key manager, thereby increasing profits.

It is to be noted that, in this embodiment, the description has been given as to the example where the encrypted content generated by the content management system 4 in response to a request of encryption from the content provision system 1 is stored as an archive. That is, in this embodiment, the encrypted content is recorded in the recording device 37 of the content management system 4.

However, there may be a case where a person who encrypts the content is different from a person who stores the encrypted content, for example. In such a case, the management section 30 is eliminated from the configuration and processing of inquiring the management section 30 about presence/absence of the encrypted content from another element is also eliminated in the content management system 4.

Additionally, in this embodiment, the contents ID of the stored encrypted content and the user ID are associated with each other in the content management system 4. Likewise, the storage content ID and the user ID are associated with each other in the content management system 4.

Therefore, by just including the user ID in an acquisition request, the user can retrieve all content IDs and storage content IDs associated with this user ID and acquire all encrypted contents and storage contents indicated by the retrieved content IDs and storage content IDs. As a result, The user can readily reacquire all stored contents and partial contents. In this case, for example, the acceptance distributing section 34 may retrieve content IDs and storage content IDs or another section may retrieve the same based on a user ID included in an acquisition request. Furthermore, a retrieval section may be added to the content management system 4 so that this retrieval section can retrieve content IDs and storage content IDs based on the user ID included in an acquisition request.

Further, although functions of the content provision system 1, the content distribution system 2, the user terminal 3 and the content management system 4 are realized by the program in this embodiment, these functions may be realized by hardware.

Furthermore, the arrangement of respective constituent elements included in the content distribution system according to this embodiment may be changed as long as the same operations can be realized, the respective constituent elements may be freely combined with each other, and the respective constituent elements may be freely divided.

Moreover, the various systems described in conjunction with this embodiment may comprise a plurality of computing machines, the program may be distributed to the plurality of computing machines in order to execute processing in cooperation with each other.

Additionally, for example, an internal memory or a hard disk is applied to each recording device. Each of the recording devices may be an element comprising a database.

The program according to this embodiment can be written in a recording medium such as a magnetic disk (a flexible disk, a hard disk and others), an optical disk (a CD-ROM, a DVD and others) or a semiconductor memory and applied to a computer. Further, the program can be transmitted through a communication medium and applied to a computer. The computer realizes the above-described functions by reading a program and controlling operations by the program.

In this embodiment, a person who issues the storage request for the encrypted content and partial content may be different from a person who issues an acquisition request corresponding to the storage request. For example, a given person stores the encrypted content and partial content, whilst a predetermined concerned party, e.g., a family of the person who has stored the content may acquire the encrypted content and storage content corresponding to the stored content. Such an operation can be readily realized by, e.g., determining the user ID as data which identifies a user group and assuring the bookshelf B in accordance with each user group.

Second Embodiment

In this embodiment, a description will be given as to a modification of a storage format for the encrypted content and storage content in the first embodiment.

In the first embodiment, overlapping encrypted contents themselves are included in one of the respective bookshelves B and reference data is included in other bookshelves B in order to eliminate overlapping storage of encrypted contents.

Figure 8:
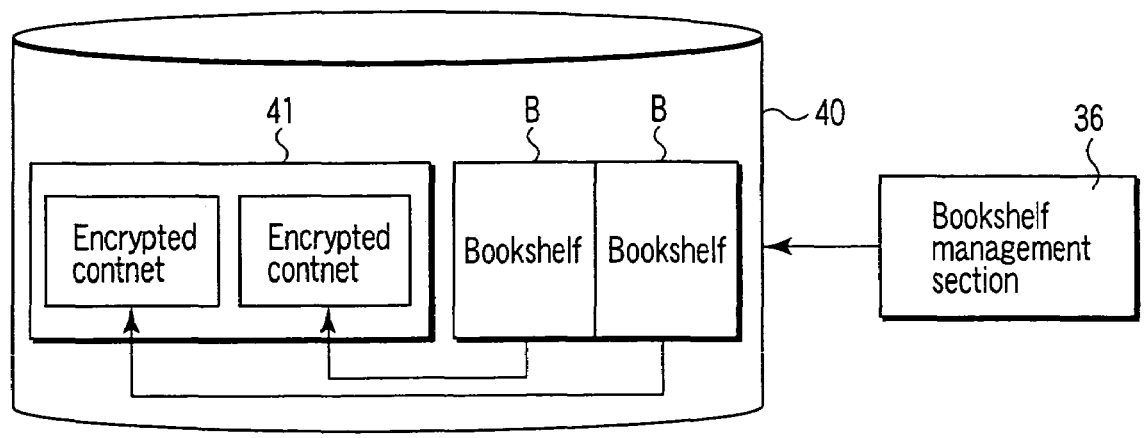
FIG. 8 is a block diagram showing a first modified example of a storage form of an encrypted content.

However, as shown in FIG. 8, an encrypted content storage area 41 may be provided in an area different from the bookshelves B of the user in the library 40 so that all encrypted contents are managed in this area 41.

Figure 9:
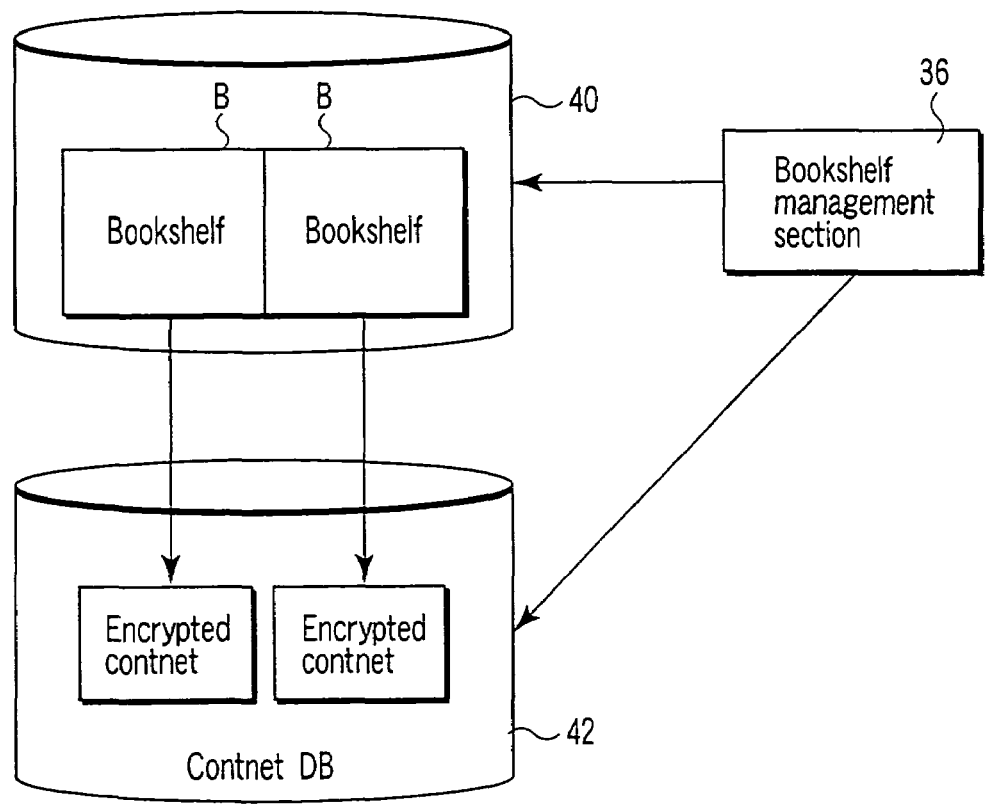
FIG. 9 is a block diagram showing a first modified example of a storage form of an encrypted content.

Furthermore, as shown in FIG. 9, a content database 42 different from the library 40 may be provided so that all encrypted contents are managed in the content database 42.

In case of FIGS. 8 and 9, although reference data for encrypted contents and storage contents are included in all the bookshelves B of the user, the encrypted contents themselves are not included.

In the first embodiment, the encrypted content generated in response to an encryption request from the content provision system 1 is stored in the content management system 4 as an archive, and storage content is managed in the bookshelf B of the user.

Figure 10:
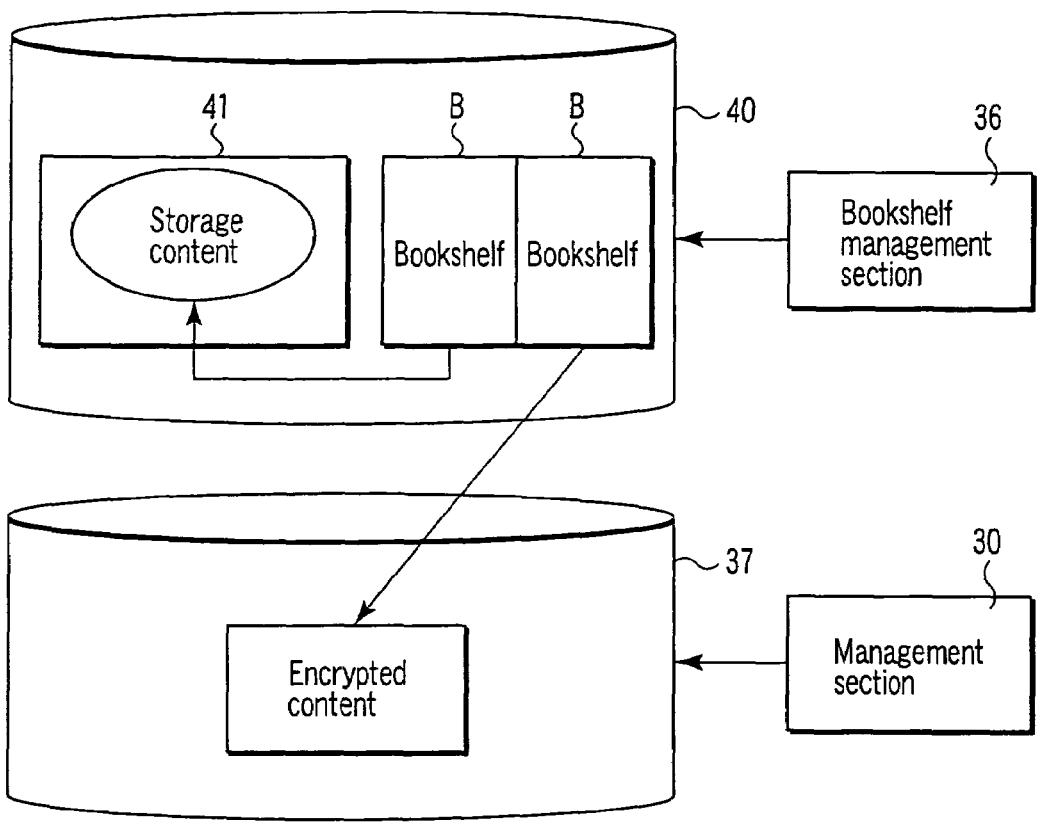
FIG. 10 is a block diagram showing a modified example of a storage form of an encrypted content and storage content.

However, as shown in FIG. 10, the management section 30 may record all encrypted contents in the recording device 37 and manage these contents, and the bookshelf management section 36 may record storage contents only in the storage area 41 in the library 40 and manage these contents. In this case, the bookshelf management section 36 reads the storage content based on the reference data in the bookshelf B of the user, and the management section 30 reads the encrypted content. Moreover, the configuration of FIG. 10 may be combined with that of FIG. 9 and the storage contents may be managed in a content database 42 different from the library 40.

In the case of FIG. 10, the reference data for encrypted content and reference data for storage content are included in the bookshelf B of the user, but the encrypted content and storage content themselves are not included.

As a result, the content management system 4 can be flexibly constituted, thereby simplifying resources.

Third Embodiment

In this embodiment, a description will be given as to a modification of a storage request for encrypted contents in the first embodiment.

In the first embodiment, in order to reduce a communication quantity, the user terminal 3 first transmits a storage request which includes the content ID but does not include encrypted content to the content management system 4, and the encrypted content is transmitted when it is determined that the encrypted content as a storage target is not yet recorded by the content management system 4.

However, when the encrypted content has a size which does not affect communication, the storage request may include the encrypted content itself and then be transmitted. As a result, a step in which the content management system 4 has the user inductively transmit content can be eliminated, thereby increasing the processing efficiency.

It is to be noted that a storage request may be transmitted with reference data (e.g., URL) for the encrypted content included therein.

Fourth Embodiment

In this embodiment, a description will be given as to a modification of a storage request for the partial content in the first embodiment.

In the first embodiment, the encrypted content generated in accordance with an encryption request of the content provision system 1 is stored as an archive in the content management system 4.

In this embodiment, the user terminal 3 transmits to the content management system 4 a storage request including positional data of the partial content for an original content in place of the partial content. The content management system 4 picks up the partial contents from the original contents, and encrypts and stores the clipped content by using this positional data.

Figure 11:
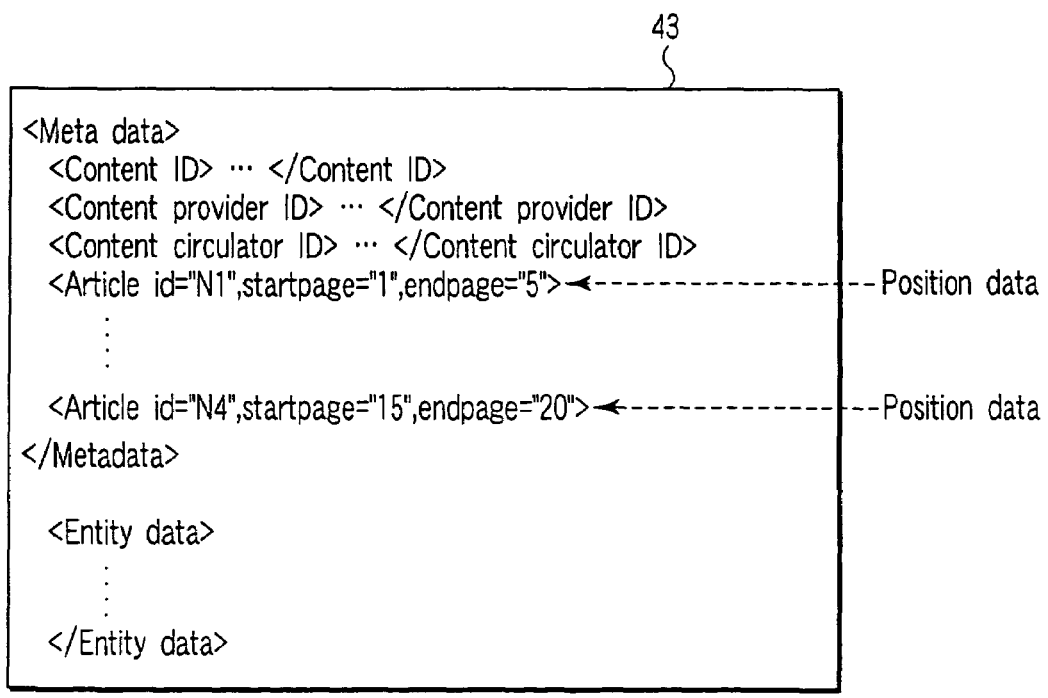
FIG. 11 is a view showing a concrete example of an original content.

FIG. 11 is a view showing a concrete example of the original content.

For example, in a content 43 written in an XML (Extensible Markup Language) or the like, the content of data is classified into items by using tags.

The content 43 include meta data and entity data.

In the meta data is written a content ID, a content provider ID, a content circulator ID, an article ID and a corresponding page number.

A content of the article is written in the entity data. Contents of each article are specified by the article ID.

In cases where articles indicated by article IDs "N1" and "N2" are clipped from the original content and these partial contents are stored, tags indicative of the cut parts are determined as positional data "article id="N1", startpage="1", endpage="5"" and "article id="N4", startpage="15", endpage="20"", and the positional data are included in a storage request.

Since the content management system 4 stores the encrypted content obtained by encrypting the content, the encrypted content is decrypted and partial content indicated by the positional data is obtained.

Then, the content management system 4 encrypts the obtained partial content and stores the encrypted content.

As a result, a quantity of communication between the user terminal 3 and the content management system 4 can be reduced, and a processing burden on the user terminal 3 is decreased.

It is to be noted that, when data added by the user is included in the partial content, a storage request may be transmitted with the partial content having the added data included therein.

Moreover, the same technique as that for the encrypted content may be applied to the partial content, thereby eliminating overlapping storage.

INDUSTRIAL APPLICABILITY

The present invention is utilized in a content circulation field.

What is claimed is:

1. A content management system comprising:
a unit which accepts a storage request including change content obtained by changing content whose utilization restriction is released by right data and a content ID to identify the content;
a unit which, based on the storage request, makes reference to a recording unit which records utilization restricting data used to restrict the utilization of the content and the content ID in association with each other to create a storage content obtained by restricting the use of the change content by using the utilization restricting data;
a storage unit which issues a storage content ID to identify the storage content, provides a storage request issuer with the storage content ID, and records in the recording unit the storage content ID and the storage content in association with each other;
a unit which accepts an acquisition request including the storage content ID;
a unit which reads the storage content from the recording unit based on the acquisition request; and
a unit which distributes the storage content read based on the acquisition request to an acquisition request issuer.

2. The content management system according to claim 1, wherein the storage unit issues the storage content ID, provides the storage request issuer with the storage content ID and records the storage content ID and the storage content in the recording unit in association with each other when the storage content and the storage content ID are not yet recorded in the recording unit in association with each other, and records reference data which is used to make reference to the storage content and the storage content ID in the recording unit in association with each other when the storage content and the storage content ID have been already recorded in the recording unit in association with each other.

3. A content management system comprising:
a unit which accepts a storage request including a content ID to identify a content whose utilization restriction is released by right data and positional data of a partial content as a part of the content with respect to the content;
a unit which, based on the storage request, makes reference to a recording unit which records utilization restricting data used to restrict the use of the content, the content ID and the content in association with each other to create a partial content from the content and the positional data and create a storage content obtained by restricting the use of the partial content by using the utilization restricting data;
a storage unit which issues a storage content ID to identify the storage content, provides a storage request issuer with the storage content ID, and records the storage content ID and the storage content in the recording unit in association with each other;
a unit which accepts an acquisition request including the storage content ID;
a unit which reads the storage content from the recording unit based on the acquisition request; and
a unit which distributes the storage content read based on the acquisition request to an acquisition request issuer.

4. The content management system according to claim 3, wherein the storage unit issues the storage content ID, provides the storage request issuer with the storage content ID and records the storage content ID and the storage content in the recording unit in association with each other when the storage content and the storage content ID are not yet recorded in the recording unit in association with each other, and records reference data which is used to make reference to the storage content and the storage content ID in the recording unit in association with each other when the storage content and the storage content ID have been already recorded in the recording unit in association with each other.

* * * * *